United States Patent [19]

Albrecht

[11] Patent Number: 4,934,411
[45] Date of Patent: Jun. 19, 1990

[54] INSERT MEANS FOR FLUID FLOW SYSTEM

[76] Inventor: David E. Albrecht, Fluid Power, Inc., P.O. Box 124, Blue Bell, Pa. 19422

[21] Appl. No.: 638,351

[22] Filed: Aug. 6, 1984

[51] Int. Cl.⁵ .............................................. F16K 27/00
[52] U.S. Cl. .................................... 137/884; 137/270
[58] Field of Search ...................... 137/269.5, 270, 884; 251/367; 411/103, 105, 107, 108, 109, 180, 368, 378, 427

[56] References Cited

U.S. PATENT DOCUMENTS

| | | | |
|---|---|---|---|
| 2,400,348 | 5/1946 | Greene | 411/107 |
| 2,407,586 | 9/1946 | Summers | 411/107 |
| 2,651,324 | 9/1953 | Hodgson et al. | 137/884 X |
| 2,834,368 | 5/1958 | Gray | 251/367 X |
| 2,944,562 | 7/1960 | Glasgow et al. | 137/270 |
| 3,111,139 | 11/1963 | Bechelt et al. | 137/884 |
| 3,204,586 | 9/1965 | Marsh, Jr. | 411/378 X |
| 3,215,158 | 11/1965 | Bass, Jr. et al. | 137/315 X |
| 3,509,904 | 5/1970 | Olson | 137/884 X |
| 3,523,600 | 8/1970 | Nelson | 137/271 |
| 3,563,131 | 2/1971 | Ridley, Sr. | 411/427 X |
| 3,875,959 | 4/1975 | Buteill | 137/884 X |
| 4,271,870 | 6/1981 | Butler et al. | 138/94.3 |
| 4,334,785 | 6/1982 | Blach | 277/DIG. 6 |

FOREIGN PATENT DOCUMENTS

| | | | |
|---|---|---|---|
| 2521680 | 11/1976 | Fed. Rep. of Germany | 137/884 |
| 1302255 | 7/1962 | France | 137/884 |
| 1325312 | 3/1963 | France | 411/403 |

Primary Examiner—John C. Fox
Attorney, Agent, or Firm—Frank A. Follmer

[57] ABSTRACT

An insert for a fluid flow system is constructed of a body having a plurality of faces two of which are adapted to mate with corresponding faces of fluid flow components of the system with the body inserted therebetween and a plurality of stud adapters each of which has an externally threaded male end and an internally threaded female end and an enlarged portion forming a bearing surface. One end of each stud adapter is adapted to threadedly engage one of the system components with the bearing surface in bearing contact with the corresponding face thereof for supporting the body with one body face in contact with one of the system components and the other end of each stud adapter is adapted to be threadedly engaged with the mechanism for mounting the other of the system components in contact with the other body face.

34 Claims, 10 Drawing Sheets

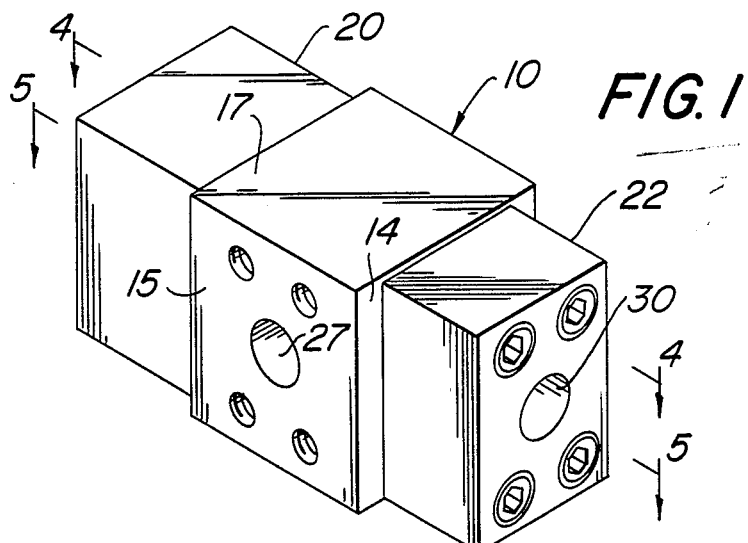
FIG. 1
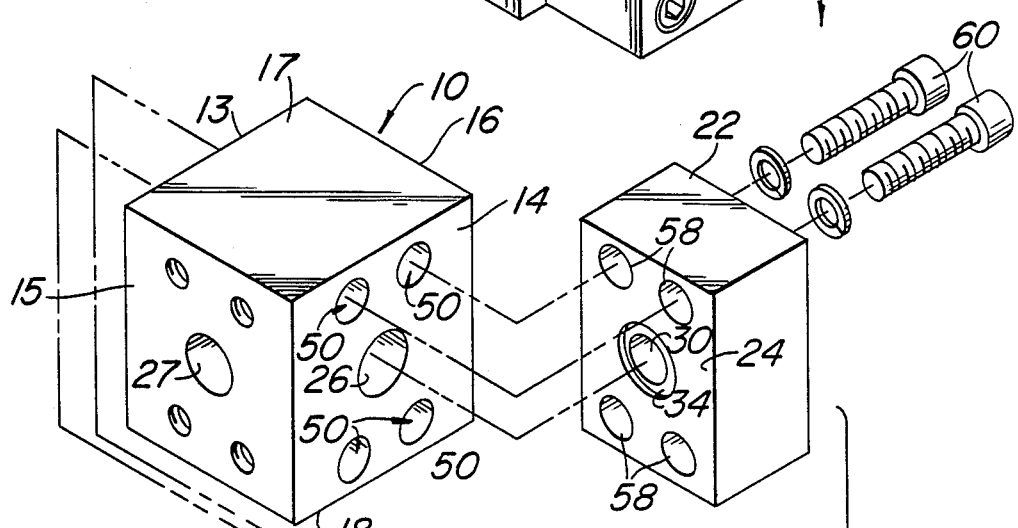
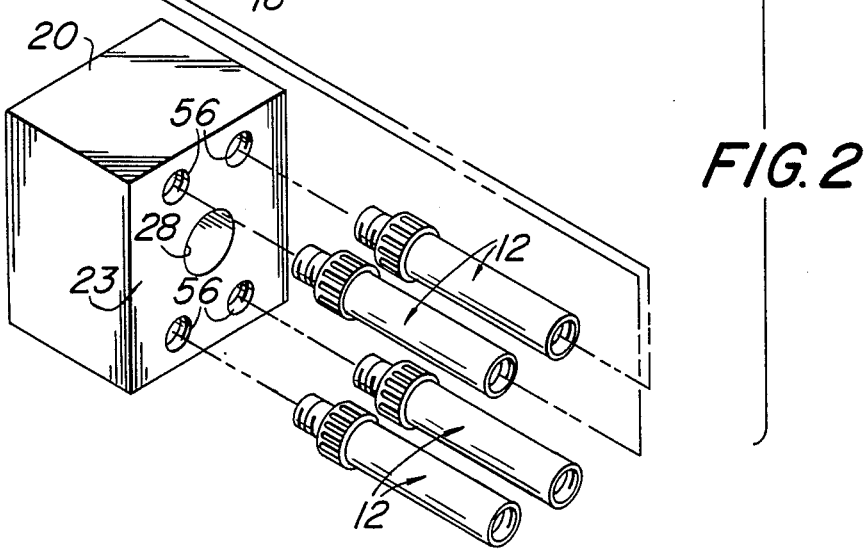
FIG. 2

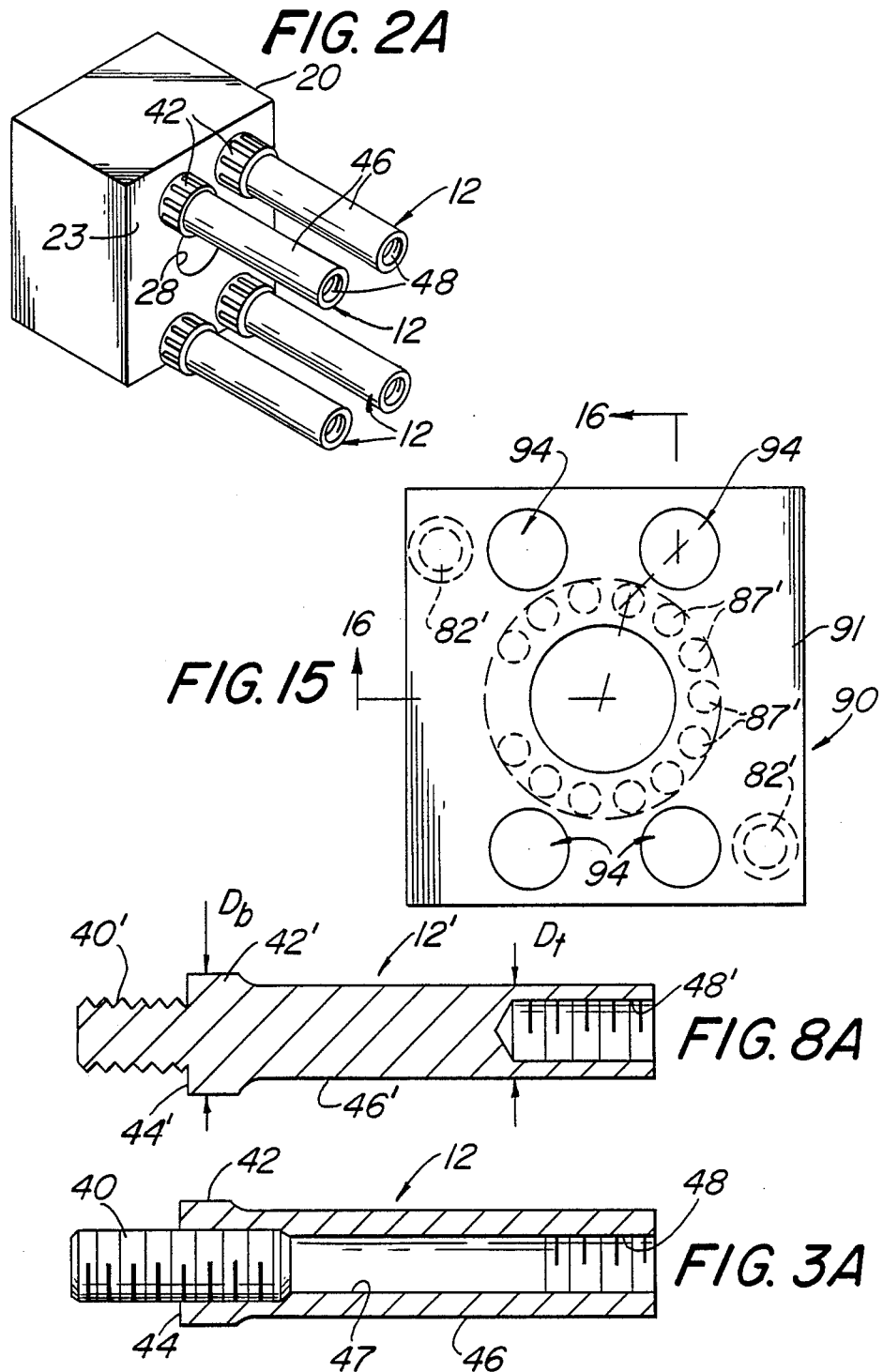

INSERT MEANS FOR FLUID FLOW SYSTEM

BACKGROUND OF THE INVENTION

This invention relates generally to an insert means for a fluid flow system.

Fluid systems are essentially envelopes that direct and control the medium they contain for some useful purpose. While fluid systems have been in use for many years, they are still faced with problems in their construction and operation. Threaded piping has been used for a long time as a means of conveying a fluid from a source to a destination with a series of valves or other control devices nested along the flow path. However, the helical character of pipe threads makes positive sealing a difficult task and threaded joints have been proven to be unreliable as a sealing means. In a network of this type of installation, a large number of fittings are often required. For every fitting means there is required not only more joints, and, therefore, more locations for leakage, but also there is required increased assembly time in sizing and threading pipe and selecting the correct fittings. Also, piping to and from control valves utilizes large amounts of space, material and human resources and provides a sloppy appearance. Further, troubleshooting piping circuits is often very difficult in that it becomes an exercise of pipe tracing. Also, if a problem is discovered, maintenance of inline components is troublesome and costly. Further, once pipe connections are broken and reassembled as for repair or the like, they are often prone to leaking.

Another approach of the prior art is to replace the threaded pipe with tubing having SAE O-ring connections to eliminate the helical fluid leakage associated with pipe threads. However, a tubing system still requires a long assembly time and an increased degree of skill for manufacture and installation. Also, little space is saved over conventional piping systems and tubing systems offer inadequate structural support for heavy inline components. Further, tub fittings themselves offer little resistance to torsional loading.

In an attempt to overcome the above-described problems of piping and tubing systems, the prior art has employed drilled manifolds employing subplate mounted valves in the system design. The use of manifolds eliminates piping and tubing between the valves and minimizes piping joints. Also, the joints themselves, being of an O-ring type, offer superior sealing capabilities. While they generally provide for a more compact system and ease of assembly, conventional manifolds are often large, heavy and difficult to work with. Also, design time is high and little flexibility is offered with one design.

U.S. Pat. No. 3,654,960 discloses a prior art design involving a modular hydraulic system comprised of housing units for various components which are coupled to other similar units by means of bolts connected in end-to-end relationship. The bolt coupling of this design limits its effectiveness and practicality.

SUMMARY OF THE INVENTION

This invention relates generally to an insert means for a fluid flow system having at least a pair of fluid flow components.

Briefly stated, the insert means in accordance with the invention comprises a body having a plurality of faces, two of these faces being adapted to mate with corresponding faces of the fluid flow components of the system with the body inserted therebetween. The body has a fluid flow passage for the flow of fluid between the pair of system components. The insert means in accordance with the invention also includes a plurality of stud adapters each of which has an externally threaded male end and an internally threaded female end. Each stud adapter has an enlarged wrenching portion located adjacent the male end and forming a bearing surface, this wrenching portion having a peripheral surface configuration adapted to be engaged by a wrench or the like. The body has a bore accommodating each stud adapter and extending between the two faces thereof, each of these bores having an enlarged portion adjacent one of the two faces adapted to receive the wrenching portion of an associated stud adapter. The arrangement is such that the male end of each stud adapter is adapted to threadedly engage one of the system components with said bearing surface in bearing contact with the corresponding face thereof for supporting the body with said body face in contact with one of the system components and the female end of each stud adapter is adapted to threadedly engage with means for mounting the other of said system components in contact with the other body face.

The above-described construction is such that the stud adapters can be screwed onto the bolt pattern where the insert body is to be fitted, such as for example, the fluid outlet face of a pump. The insert body then slides over these studs and another fluid system component can be attached thereto in the same manner. Insert means in accordance with the invention can be mounted to any face of the first body and grow in an almost limitless arrangement.

Such a basic building block method is much superior to any piping, tubing or manifold system available in the art today. Important advantage of the insert means in accordance with the invention are that it includes fewer and higher quality connections and requires less assembly time. This can be demonstrated by considering the need for three outlets off a mounting surface. With conventional pipework it is necessary to assemble a flange, a pipe nipple, and a cross fitting. This results in not only three outlets, but also three joints. However, with an insert means in accordance with the invention, the body is provided with a cross passage and is simply bolted directly to the mounting surface, thereby providing three outlets using only one joint. This is true at any time fittings need to be joined, as well as in any configuration thereof, because the insert means in accordance with the invention always eliminates the need for a pipe nipple and, in doing so, eliminate one connection.

Another advantage of the insert means in accordance with the invention is that the body can be manufactured to match any bolt pattern, SAE, square, etc. Likewise, the stud adapters can be drilled and tapped to metric specifications or any other standard thread system.

Another feature of the invention is that entire flow control routes can be stacked in a minimum of space with a minimum of seals.

Further advantages of the invention are reduced design time, reduced skill required in assembly, and better appearance. Moreover, the insert means in accordance with the invention provides for greater flexibility than a manifold in that it is not limited to the particular application for which it is designed. Furthermore, the insert means in accordance with the invention are entirely re-usable and inline troubleshooting is made easier since all possible malfunctioning components are within a small distance and complicated lines do not have to be treated. Thus, if a problem should be discovered, maintenance becomes nothing more than removing bolts and stud adapters.

Another feature of the invention is that valves and fittings made in accordance with the invention can be integrated to allow better use of materials. This can be illustrated by considering a 1½ inch line that requires a relief valve. It is not uncommon to branch off the line to a ¾ inch relief valve and return line. This is a substantial saving over the use of an inline 1½ inch relief valve. The coordinated use of fittings and valves pursuant to the invention can enhance this process. Thus, by using a 1½ inch to ¾ inch reducing tee pursuant to the invention and a ¾ inch relief valve, the relief valve can be moved off line with only one connection.

Another feature is that the use of an insert means in accordance with the invention provides better resistance to torsional loading and this is accomplished with a mechanical rather than a frictional lock.

BRIEF DESCRIPTION OF THE DRAWINGS

FIG. 1 is a perspective view showing an insert means in accordance with the invention inserted between two fluid system components.

FIG. 2 is an exploded view of the assembly shown in FIG. 1 and FIGS. 2A is a perspective view of a fluid system component with stud adapters engaged therewith.

FIG. 3A is a sectional view of the stud adapter shown in FIG. 3.

FIGS. 8 and 8A are sectional views showing two other types of stud adapters in accordance with the invention.

FIG. 15 is a plan view of an insert means similar to FIG. 14 except that the body design permits assembly in either of two orientations.

DESCRIPTION OF A PREFERRED EMBODIMENT

Figure 3:
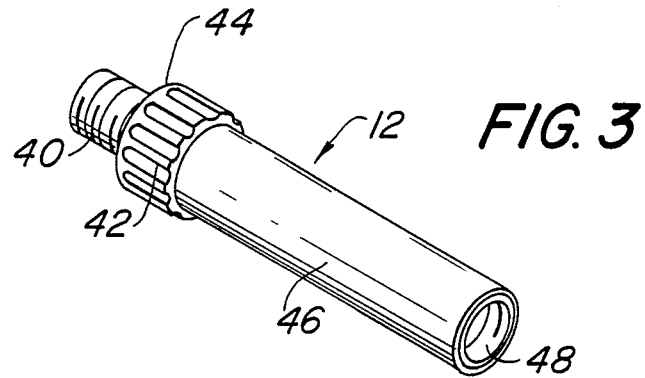
FIG. 3 is a perspective view of a stud adapter in accordance with the invention.
Figure 4:
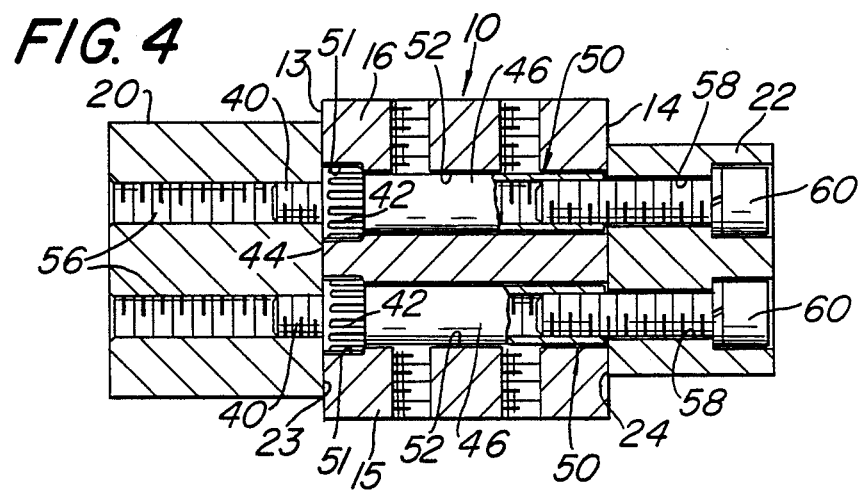
FIG. 4 is a sectional view taken on line 4—4 of FIG. 1.
Figure 5:
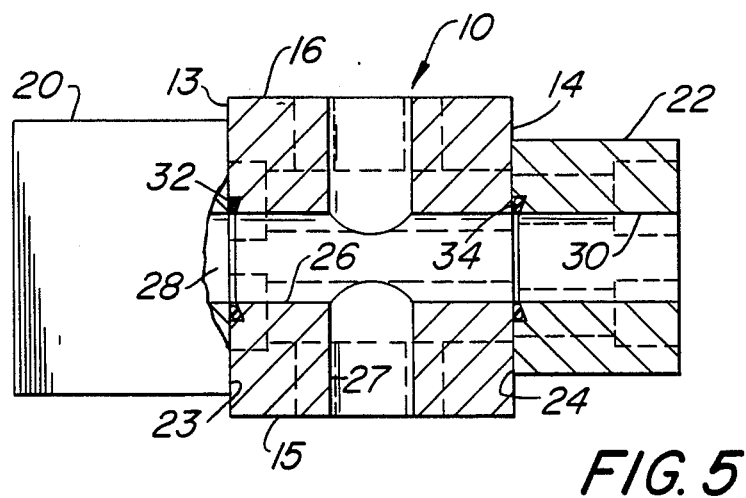
FIG. 5 is a sectional view taken on line 5—5 of FIG. 1.

Referring to FIGS. 1–5, the insert means in accordance with the invention comprises a body 10 and a plurality of stud adapters 12. Body 10 is a block construction providing six flat rectangular faces, namely, end faces 13 and 14, side faces 15 and 16, top face 17 and bottom face 18. Body 10 is adapted to be inserted between a pair of fluid flow components 20 and 22 of a fluid flow system with end faces 13 and 14 being adapted to mate with corresponding faces 23 and 24 of components 20 and 22, respectively. Body 10 is provided with a fluid passage 26 for the flow of fluid between the pair of system components 20 and 22. By way of example, component 20 may contain a pump which delivers fluid under pressure through a discharge opening 28 in face 23 and component 22 contains a flow passage 30 for delivering the fluid to a desired location. With the parts coupled together as shown in FIGS. 1, 4 and 5, discharge opening 28 is in flow communication with passage 26 at mating faces 23 and 13 and passage 26 is in communication with flow passage 30 at faces 14 and 24.

Body 10 is provided with a cross passage 27 to deliver fluid from passage 26 through side faces 15 and 16. The opening of passage 26 at face 13 is provided with a counterbore which receives an O-ring type seal 32 which is concentric with passage 26 and is adapted to seal the joint between passages 28 and 26. In a like manner, the opening of bore 30 at face 24 is provided wit a counterbore which receives an O-ring type seal 34 which is adapted to seal the joint between passages 26 and 30. Components 20 and 22 and body 10 typically provide only a portion of a fluid flow system which includes other components for various purposes. To this end, additional components may be coupled to body 10 at side faces 15 and 16 which are provided with threaded bore holes for this purpose as shown in FIGS. 1, 2 and 4.

The insert means of the invention comprises a novel means for coupling body 10 and fluid components 20 and 22 together, such means including four of the stud adapters 12 which have a unique construction. Each stud adapter 12 has a stud portion 40 forming an externally threaded male end, an enlarged wrenching portion 42 located adjacent stud portion 40 and forming an annular bearing surface 44, and a cylindrical stem portion 46 provided with an internally threaded female end 48. Wrenching portion 42 has a peripheral surface configuration adapted to be engaged by a wrench.

Body 10 is provided with a bore means 50 for accommodating each of the stud adapters 12, there being four such bore means in the embodiment of the invention shown in FIGS. 1–5. Each of the bore means 50 extends through body 10 between faces 13 and 14 and is provided with an enlarged bore portion 51 adjacent face 13 and a cylindrical bore portion 52 extending from enlarged portion 51 to face 14, as is best shown in FIG. 4. Enlarged bore portion 51 is adapted to receive the wrenching portion 42 of a stud adapter 12 and cylindrical portion 52 is adapted to receive a stem portion 46 of a stud adapter 12. Each bore means 50 is constructed so that a wrenching portion 42 of a stud adapter is contained entirely within the enlarged bore portion 51 and cylindrical stem portion 46 of a stud adapter is contained entirely within a cylintrical bore portion 52, the distance between the bearing surface 44 of the stud adapter and the female end of stem portion 46 being less than the distance between the two faces 13 and 14 of body 10.

The location of the bore means 50 in body 10 is in conformity with the pattern of threaded bolt holes 56 in mounting face 13 of component 20 which is also the same as the pattern of the bolt holes 58 in component 22. As is best shown in FIG. 2, the pattern comprises four holes arranged in a rectangular fashion symmetrically around the fluid opening 26 in body 10.

System components 20 and 22 are designed to be coupled directly together by means of four bolts 60 which are adapted to be received in counterbored bolt holes 58 in component 22 to extend from face 24 for threaded engagement in threaded bolt holes 56 in component 20. However, when the insert means in accordance with the invention is inserted between components 20 and 22, a unique assembly procedure is utilized. The first step in the assembly procedure is to screw the stud portions 40 at the male end of stud adapters 12 into threaded bolt holes 56 in component 20 to produce an assembly as shown in FIG. 2A wherein the wrenching portions 42 and stem portions 46 of each stud adapter project from face 23 of component 20. During this assembly step, the wrenching portion 42 is used to turn the stud adapter 12 to produce a preloaded contact with the mounting surface of face 23 without any permanent deformation of the contact area.

The next step is to slide body 10 over the stud adapters 12 which slide completely into bore means 50. This step is made easier than prior art assembly procedure by reason of the arrangement of the assembly shown in FIG. 2A wherein the mounted stud adapters 12 provide a supporting structure for body 10 as it is slid into position. With the procedure of the prior art, the component to be attached has to be held and aligned with the mounting bores while fastening takes place, which procedure would be required, for example, if component 22 were coupled directly to component 20 by means of bolts 60.

The next assembly step is to couple component 22 to body 10 and component 20. In this step, bolts 60 are inserted tin bolt holes 58 and the ends thereof are threadedly engaged with the female ends 48 of an associated stud adapter 12 to couple component 20, body 10 and component 22 together in an assembled unit. Bolts 60 are tightened to draw the cooperating faces 23 and 13 and 14 and 24 together whereby the sealing means 32 and 34 are compressed to provide a seal around the joints of the alinged flow passages 28, 26 and 30 as shown in FIG. 5. As shown in FIG. 4, all the stud adapters 12 fit entirely within the associated bore means 50 in body 10 so that they do not interfere with this step of coupling body 10 and components 20 and 22 together whereby the mating faces 23, 13 and 14, 24 are drawn into contact.

It is noted that with the insert means in accordance with the invention only one connection is needed between the mounting surface 23 and the body 10 which, of course, is much simpler than a piping connection where the component requires two connections in addition to a conduit line. Also, the fastening arrangement is "parallel" with the body 10 rather than in series with it, thereby permitting a smaller length. Also, the block-like bodies are designed to perform adequately under pressures many times the working pressure for safety reasons and allow standard flanges to be mounted to each face without overlapping. It will be apparent that a variety of wrenching surfaces can be provided on the wrenching portion of a stud adapter, for example, multiple flat heads, pin holes for spanner wrenches, etc. may be provided.

The unique geometry of the stud adapter in accordance with the invention will be described initially with respect to the embodiment of the stud adapter 12' shown in FIG. 8A, which is essentially the same as stud adapter 12 wherefore corresponding parts have been given the same reference numerals with primes added. This form of stud adapter comprises a single-piece structure with the diameter of the bearing surface 44' being designated $D_b$ and the diameter of the cylindrical stem portion 46' being designated by $D_t$ since it will be referred to as a tensile diameter. The diameter $D_b$ is not only the wrenching surface diameter, but also defines the bearing surface 44' which allows the stud adapters to be torqued up to, or pre-stressed to, the mounting surface of an associated fluid system component. This preloading is significant in that it isolates the elongation of each stud adapter from the other components of the system. Accordingly, for a number of components in series, no one component is more likely to fail than any other. Pursuant to the invention, it is important to design the bearing diameter $D_b$ such that the bearing surface 44' will not permanently deform or coin into the associated component surface due to the preloading effect produced. It will be apparent that for the prior art mounting means the bearing area is the annular surface contained within the bearing diameter less the diameter area of the threaded stud portion used. In the case of insert means in accordance with the invention, the total bearing area is that area contained within the bearing diameter $D_b$ as described above less the tensile diameter area (approximately $D_t$). This is a lesser area because the component body 10 is provided with a bore portion 52 adapted to receive the stem portion of the stud adapter. As was stated above, the contained portion of the stud adapter itself is just shorter than the length of the body 10 to allow for elongation, whereby preloading is done entirely between the bearing surface and the component surface.

The determination of the actual dimensions of the insert means in accordance with the invention is based on the relationship that the preload of all the stud adapters should be greater than the anticipated separating force due to pressurization of the system. Thus this separating force is:

Separating Force=(Pressure) (Projected Area)  (1)

The projected area than any pressurized fluid will realize is contained within the major diameter of the sealing O-ring, thus $F_s = P((OD)^2 \pi/4)$ where:
$F_s$=Total separating force (1b) (2)
P=Fluid Pressure (PSI)
OD=O-ring outside diameter (inches)
To find the force per adapter $F_a$, divide $F_s$ by the number of adaptors.

Knowing this, the area needed to resist permanent deformation can be determined from a variation of Hooke's Law.

$$\frac{\text{Separating Force/Adaptor}}{\text{Bearing Area}} < \frac{\text{Material Yield Point}}{\text{Safety Factor}} \quad (3)$$

The bearing area $A_b$, as mentioned previously, is:

$$A_b \pi/4 \, (D_b^2 - D_t^2)$$

Therefore:

$$\frac{F_a}{(D_b^2 - D_t^2)} \cdot \frac{4}{\pi} < \frac{\sigma_{yp}}{n} \quad (4)$$

where:
$\sigma_{yp}$ = Material yield point
n = Safety factor $$D_b^2 - D_t^2 > \frac{4nF_a}{\pi \sigma_{yp}} \quad (5)$$

The tensile diameter shaft is not merely an extension of the bearing diameter head for two reasons. First $D_b$ will have to exceed $D_t$ in order for equation (5) to be valid. The tensile area must not fail under the separating load, $F_a$:

$$\frac{\text{Separating Force/Adaptor}}{\text{Tensile Area}} < \frac{\text{Material Yield Point}}{\text{Safety Factor}} \quad (6)$$

$$\left(\frac{F_a}{(D_t^2 - D_s^2)}\right)\left(\frac{4}{\pi}\right) < \frac{\sigma_{yp}}{n} \quad (7)$$

where: $D_s$ = Tapped Hole Diameter
This reduces to:

$$D_t > \sqrt{\frac{4nF_a}{\pi \phi_{yp}} + D_s^2} \quad (8)$$

It will be apparent that in dimensioning the stud adapters consideration must also be given to the constraints provided by body configuration and the fluid flow passage opening in the mounting surface.

Figure 8:
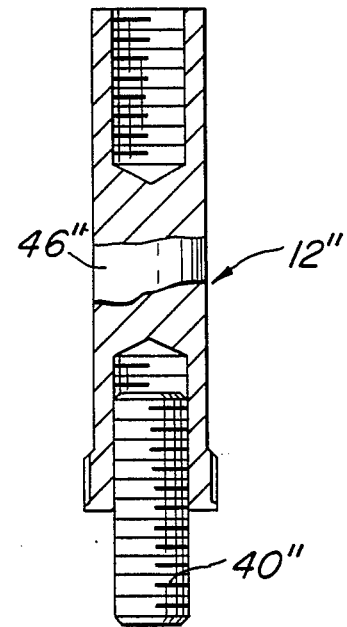

The stud adapter 12" shown in FIG. 8 is an improvement over the one-piece construction shown in FIG. 8A because it lessens the stress concentration resulting from the undercutting of the threaded stud portion while machining this threaded stud portion. Thus, the stud adapter 12" shown in FIG. 8 comprises a separate threaded stud portion 40" which is received in a threaded bore in the cylindrical stem portion 46". The stud adapter 12" shown in FIG. 8 is similar to that shown in FIGS. 8A in dimensioning and other respects.

The preferred form of stud adapter 12 is shown in FIGS. 3 and 3A in detail and is an improvement over those shown in FIG. 8 and 8A in that the stem portion 46 is made of a hollow configuration as opposed to the solid configurations of the embodiments shown in FIGS. 8 and 8A. For a solid configuration, a stress concentration exists at the area differential where the tapped hole ends and the solid portion begins. Under cyclic loading it was found that this stress concentration can cause early fatigue life. However, this condition is remedied by providing a hollow stud adapter configuration as shown in FIGS. 3 and 3A. The diameter of the axial bore 47 is again related to the required sufficient tensile area and is generally equal to the threaded stud's minor diameter.

It is noted that the stud adapter 12 in accordance with the invention uses a larger diameter than a comparable all-threaded bolt construction as used in the prior art. This larger diameter is an improvement since it provides a greater resistance to a bending moment than the prior art design. Bending moments can be created by perpendicular loading such as the horizontal mounting of a fluid system component. The stress "$\sigma$" induced by a bending moment in any part of a beam is determined from the fundamental formula for bending stress in a beam as follows:

$$\sigma = I/M_y/I \quad (9)$$

where:
M = Bending Moment
y = Distance from the neutral axis
I = Cross-sectional moment of Inertia For a solid stud of diameter D, the cross-sectional area $$A = \frac{\pi D^2}{4} \quad (10)$$

A hollow circular stud of the same cross-sectional area has an area of $$A = \frac{\pi(D_m^2 - D^2)}{4} \quad (11)$$

where: $D_m$ = Outside diameter of hollow stud.

The moment of Inertia about the center of the solid stud is:

$$I = \frac{\pi D^4}{64} \quad (12)$$

Likewise, for the hollow stud:

$$I = \pi/64 \, (D_m^4 - D^4) \quad (13)$$

In order to maintain the same cross-sectional area in both hollow and solid stud:

$$D_m = \sqrt{2} \, D \quad (14)$$

The maximum stress will occur at the outer fibres of each cross-section, or at D/2 for the solid stud and $D_m/2$ for the hollow adaptor.

The maximum stress in each cross-section due to an arbitrary bending moment M, can be determined by combining equations 10-14 into equation 9. For the solid stud:

$$\sigma = \frac{4.8M}{D^3} \quad (16)$$

For the hollow adaptor:

$$\sigma = \frac{10.2M}{D^3} \qquad (15)$$

Thus the hollow stud has a much lower induced stress due to a bending moment than does its solid counterpart of the same cross-sectional area. Further reduction of bending stress is achieved by having the larger bearing diameter at the point of maximum bending moment.

Figure 6:
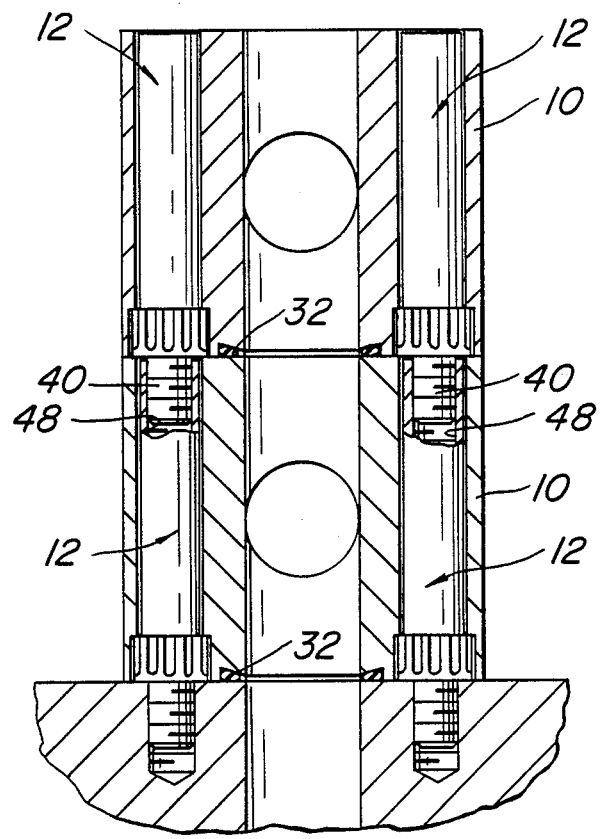
FIG. 6 is a sectional view showing a pair of insert means in accordance with the invention stacked together.

FIG. 6 shows an embodiment of the invention whereby a plurality of insert means in accordance with the invention are coupled together and demonstrates that a series of insert means can be mounted in any direction in an infinite number of patterns. Thus, each additional insert means is comprised of a body 10 and a plurality of stud adapters 12 similar to that described with respect to the embodiment shown in FIGS. 1-5. There is also provided a sealing means in the leading face of each body 10. As shown in FIG. 6, when the two insert means are connected together the stud portion 40 of the stud adapters 12 of the second insert means are threadedly engaged with the female end 48 of the stud adapters for the first insert means and the body 10 of the second insert means is mounted in the same manner as described above with respect to FIGS. 1-5.

Figure 7:
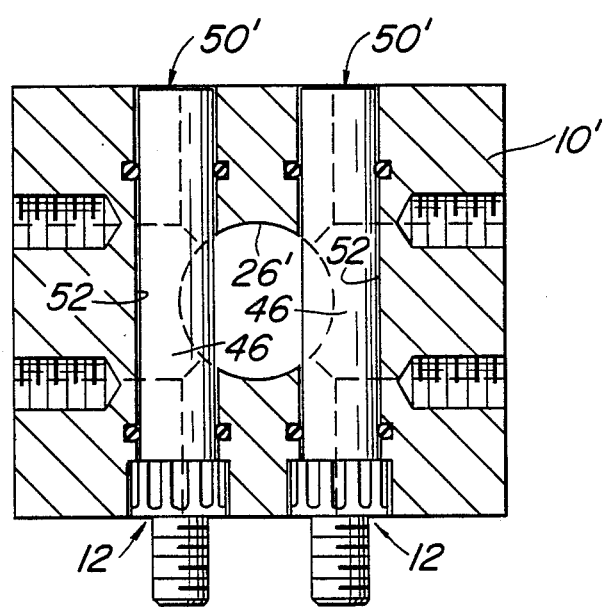
FIG. 7 is a sectional view showing another body means in accordance with the invention.

FIG. 7 shows an embodiment of the invention where, for dimensional consideration or otherwise, the bores 50' containing the stud adapters 12 are in flow communication with a fluid flow passage 26' passing through the body 10'. This embodiment demonstrates the advantage of the stem portion 46 having a cylindrical configuration since it permits the provision of O-ring-seals to be used. As shown in FIG. 7, the O-ring sealing means are located to extend around the cylindrical stem portions 46 of the stud adapters 12 at locations to seal the cylindrical bore portion 52 for the stud adapters 12 against the flow of fluid therethrough from the fluid flow passage 26' provided in the body 10'. By this construction, it is possible that the stud adapters can be passed through a cavity in the body without the danger of leaking to thereby add another dimension to its applicability.

Figure 9:
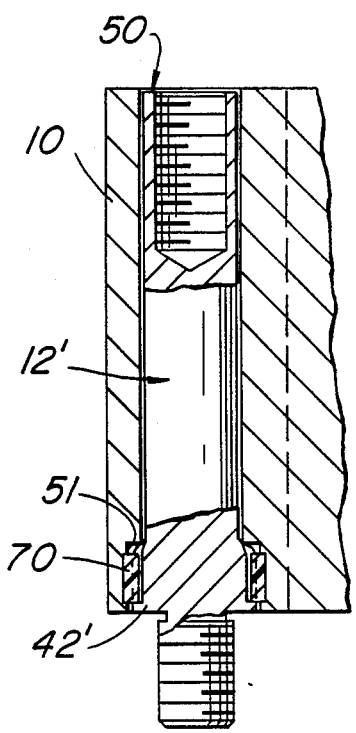
FIG. 9 is a fragmentary sectional view illustrating another stud adapter in accordance with the invention.

In FIG. 9 there is shown an embodiment of the invention which overcomes the problems that arise in the disassembly of fastening members, typically bolts or studs, that are attached to one another in series. The problem is that it cannot be predicted which of the fastening members will break open first when a unscrewing rotation is applied to the fastening member at the end of the series. This problem can be serious in a manifold construction where every component in line must be removed to ensure bolt torque integrity and exists even if only the last component in the line must be removed. A solution to the problem in the insert means in accordance with the invention is the provision of means for resisting rotating of a stud adapter 12 positioned within a bore means 50 in the body 10. Pursuant to the invention, the rotational resistance is operative only when the stud adapter 12 has a body 10 supported thereon and is not effective on the last set of stud adapters in the series during the loosening or tightening thereof. It is noted that with the insert means in accordance with the invention, a body 10 is always removed from the assembly during a stud adapter fastening or unfastening operation. Accordingly, the last set of stud adapters can be removed as desired since there is no restraining means effective thereon.

In FIG. 9 there is provided an annular resilient insert 70 held, such as by cementing, inside the enlarged bore portion 51 of the bore means 50 in body 10. The internal diameter of the insert 70 is just less than the diameter of the wrenching portion 42' of the stud adapter 12'. Thus, insert 70 is larger than the space between the surface of wrenching portion 42' and the wall of the enlarged bore portion 51 so as to be deformed therebetween when a stud adapter 12' is inserted within a bore means 50 of body 10. Accordingly, insert 70 provides engagement between body 10 and stud adapter 12' to resist rotation of the stud adapter. By reason of the provision of these retaining inserts 70, the last set of stud adapters in a series that are being wrenched for disassembly will always break open before any others in the series, since the rotation of the others is resisted by the engagement with inserts 70 in body 10.

Figure 10:
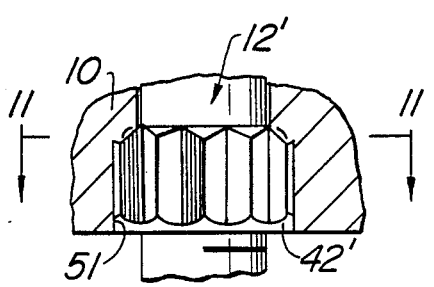
FIG. 10 is a fragmentary view of another stud adapter construction in accordance with the invention.
Figure 11:
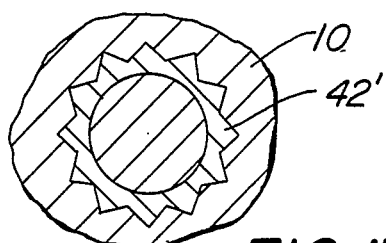
FIG. 11 is a sectional view taken on line 11—11 of FIG. 10.

In FIGS. 10 and 11 there is shown another means for resisting rotation of a stud adapter 12' positioned in the bore means 50 of a body 10. In this arrangement, the depth of the enlarged bore portion 51 in body 10 is just less than the depth of the wrenching portion 42' of the stud adapter 12' and the body 10 is made of a softer material than the wrenching portion 42' of the stud adapter 12' so that the stud adapter 12' will coin into the body 10 during assembly to thereby serve as a mechanical lock against rotation.

Figure 13:
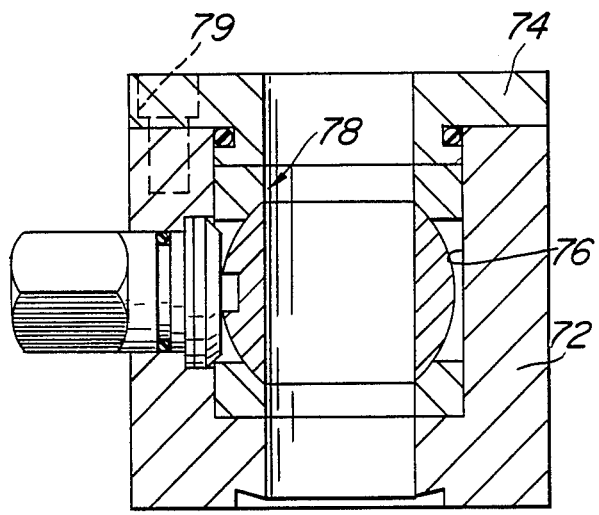
FIG. 13 is a sectional view of the insert means shown in FIG. 12 taken on line 13—13 thereof.
Figure 12:
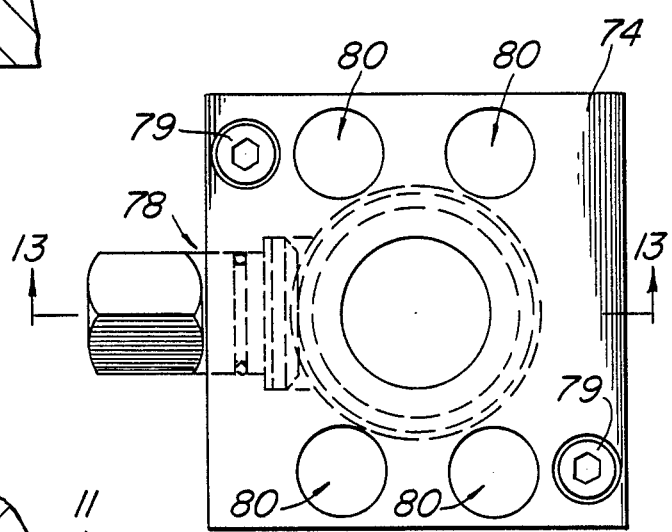
FIG. 12 is a plan view showing an insert means in accordance with the invention wherein the body is provided with a ball valve member.

In the embodiment of the invention shown in FIGS. 12 and 13 there is provided a valve means contained in the body of the insert means for controlling the flow of fluid through a fluid flow passage therein. The body is made of a main body portion 72 and a mounting head portion 74. The main body portion 72 has a cavity 76 formed therein for receiving a valve means 78 as shown in FIGS. 12 and 13, this valve means comprising a ball valve unit of a conventional construction. The mounting head portion 74 is constructed and arranged for containing the valve means 78 in position in the cavity 76 and is secured to the main body portion by a pair of bolts 79. The two part body is provided with four bores 80 for receiving stud adapters 12, these bores 80 having the same configuration as bores 50 in the embodiment of the invention shown in FIGS. 1-5. The construction wherein an insert means of the invention has a valve means incorporated therein is an advantageous one. The valve means becomes an integral portion of the body of the insert means and can be stacked in the same manner as the insert means shown in FIGS. 1-5.

Figure 14:
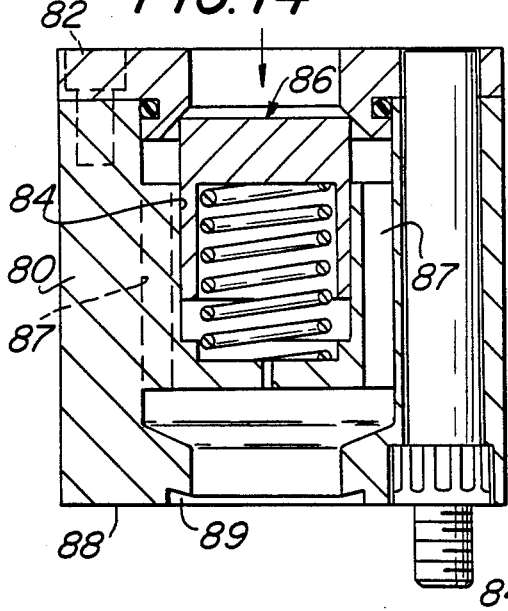
FIG. 14 is a sectional view of an insert means in accordance with the invention wherein the body is provided with a check valve.

In FIG. 14 there is shown an embodiment of the invention similar to that shown in FIGS. 12 and 13 in that the body is made of a two part construction and a valve means is contained therein. Thus, the body is made of a main body portion 80 and a mounting head 82, a cavity 84 being formed in the main body portion 80 for receiving a conventional check valve means 86 as shown in FIG. 14. The flow through the two part body is in the direction of the arrow shown in FIG. 14 with main body portion 80 containing bypass flow passages 87.

It will be apparent that an insert means such as that shown in FIG. 14 is basically direction sensitive. In other words, the insert means can only be mounted in one orientation, i.e., for the check valve of FIG. 14 the free flow must originate from the leading face 88 whereat the sealing means 89 is provided. Accordingly, this limitation of the orientation of the valve components with respect to the sealing face dictates the growth of the flow system circuit away from the source. While this can be beneficial in that an error cannot be made in mounting a direction dependent valve incorrectly, it may be the case that directional orientation is not desired. In the embodiment of the invention shown in FIGS. 15 and 16 the construction is such that the valve containing insert means can be mounted in either of two orientations. This disensitizes the valve containing insert means with respect to direction and enhances the applicability of an otherwise single direction oriented valve, such as a check valve.

Figure 16:
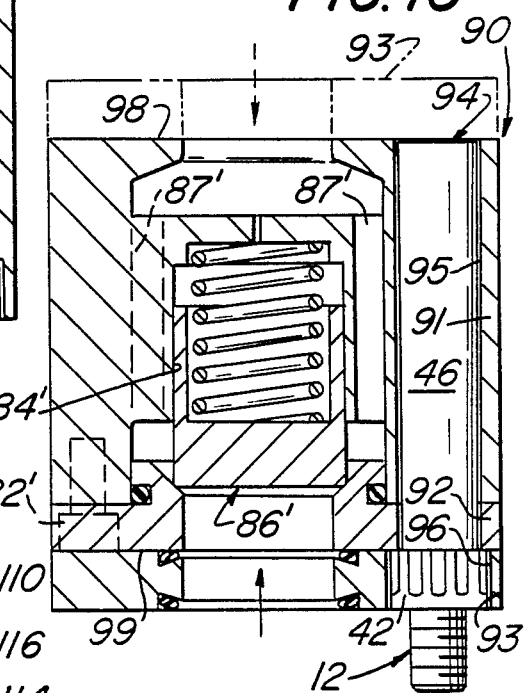
FIG. 16 is a sectional view taken on lines 16—16 of FIG. 15.

Referring to FIGS. 15 and 16, the insert means includes a body 90 made of a main body portion 91, a mounting head portion 92 and an end plate portion 93. Body 90 is provided with four stud adapter receiving bores 94 each comprised of a cylindrical bore portion 95 formed in the main body portion and an enlarged bore portion 96 formed in the end plate portion 93. The cylindrical bore portion 95 is adapted to contain the system portion 46 of a stud adapter 12 and the enlarged bore portion 96 is adapted to contain the wrenching portion 42 of a stud adapter 12 as is shown in FIG. 16. The valve means is the same as that of FIG. 14 and comprises a check valve 86' received in a cavity 84 in body portion 91 and contained therein by mounting head portion 92 which is secured to body portion 91 by two bolts 82'. Flow through the three part body 90 is in the direction of the arrow in FIG. 16 by way of the bypass flow passages 87' in body portion 91. The end plate portion 93 is adapted to be mounted in either of two positions, the solid and dashed line positions shown in FIG. 16. In the dashed position end plate portion 93 is in face-to-face contact with the main body portion 91 at face 98. In the solid line position end plate portion is in face-to-face contact with face 99 of mounting head portion 92. Accordingly, the parts can be arranged so as to locate an enlarged bore portion 96 at opposite ends of an associated cylindrical bore portion 95. By this construction stud adapters 12 can be mounted in the three part body in either of two opposite orientations so that the body 90 can be mounted to a fluid system component in either of two opposite orientations.

Figure 17:
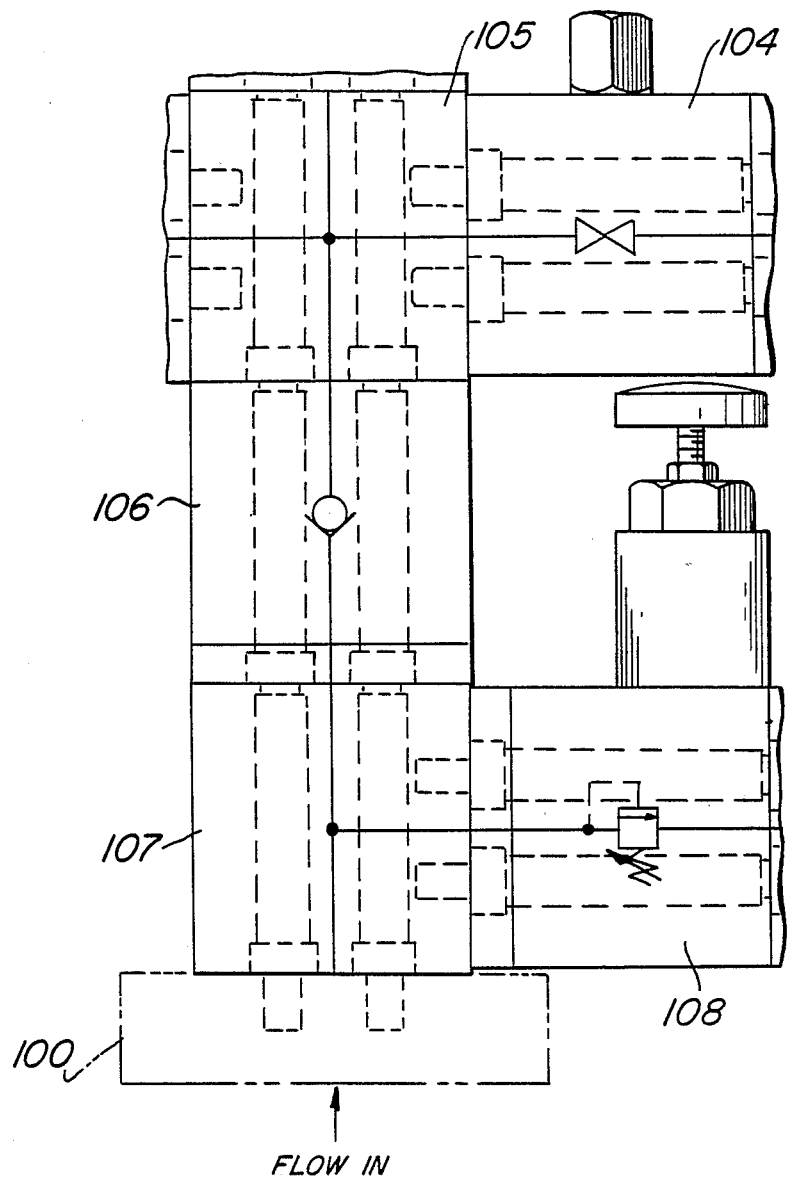
FIG. 17 is a plan view of a fluid system comprising a plurality of components made of insert means in accordance with the invention.

FIG. 17 illustrates the potential of constructing an entire fluid flow system from the insert means in accordance with the invention with the flow control route being stacked in a minimum of space with a minimum of seals. As shown in this FIG., the top face of each body is provided with a schematic marking depicting the actual flow path of the fluid flow passage and any valving or flow control means therefor contained in the body. By reason of the provision of this marking, an actual schematic is formed by the assembly of a plurality of the bodies adjacent one another into a fluid flow system as shown in FIG. 17. There is shown a flow system comprising a plurality of insert means in accordance with the invention interconnected together and receiving flow from an input component 100. Five of the insert means bodies 104–108 are arranged in a C-shaped configuration as shown in FIG. 17. As indicated by the markings on their top faces, the body 104 contains a two-way valve, the body 105 contains a cross flow passage, the body 106 contains a check valve, the body 107 contains a tee flow passage, and the body 108 contains a relief valve. When the bodies 104–108 are connected together as shown in FIG. 17, a user can quickly determine the nature of the flow control system by merely observing the markings on the top faces thereof.

Figure 18:
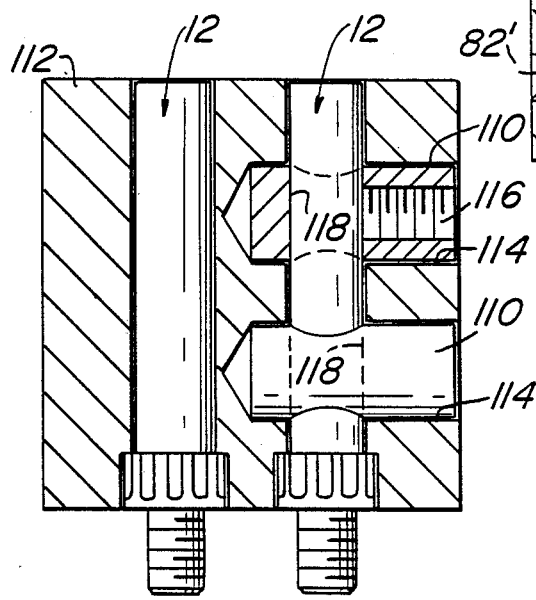
FIG. 18 is a sectional view of another embodiment of the invention.
Figure 19:
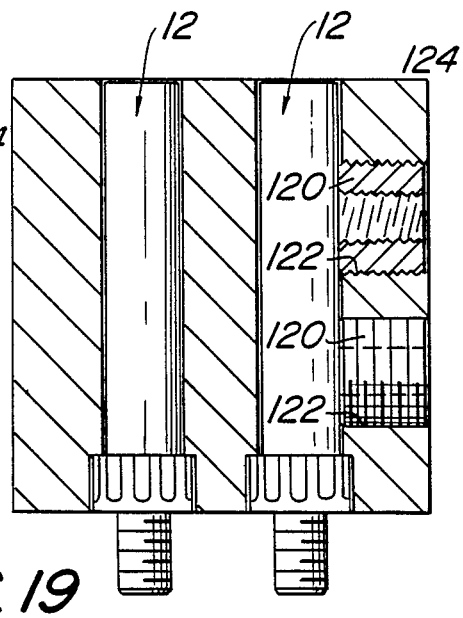
FIG. 19 is a sectional view of still another embodiment in accordance with the invention.

In FIGS. 18 and 19 there are shown embodiments of the invention which are adapted for high pressure service. In these embodiments there are provided insert members which are manufactured out of a higher grade steel than the insert means body itself, the insert members being provided with threaded openings for engagement with stud adapters or bolts for mounting an adjacent body or component. By the arrangement shown in these embodiments, the same thread engagement can resist a greater separating force and, in fact, it is possible for the threaded portion to approach the strength of the bolt or stud adapter inserted into it. In FIG. 18 there is shown a pair of insert members 110 which are anchored by a stud adapter 12 in body 112. Insert members 110 are received in bores 114 in the body 112 and have internally threaded portions 116 for threadedly engaging a threaded member secured to the body 112, such as a stud adapter or mounting bolt. Each insert member 110 has a transversely extending bore 118 arranged to have a stud adapter 12 extend therethrough for anchoring the insert member 110 to the stud adapter 12.

In the embodiment shown in FIG. 19, a pair of insert members 120 are externally threaded and are threadedly engaged in an internally threaded bore 122 in the face of the body 124 to which the high pressure component is to be attached.

As shown in FIGS. 18 and 19 it is apparent that the diameter of the insert members 110 and 120 must exceed the diameter of a stud adapter or bolt to be threadedly engaged therewith. The minimum amount that the diameter of the insert member must exceed the stud adapter diameter is related to the anticipated stress and is determined by the following relationship:

$$\frac{\text{Separating Force/Insert}}{\text{Tensile Area}} < \frac{\text{Material Yield Point}}{\text{Safety Factor}}$$

It is noted that the threaded insert member 120 achieves its higher strength advantage by increasing the thread tensile area of the body 124 by transferring the load to a larger diameter as is apparent from FIG. 19. In other words, this construction has the advantage of reducing the body stresses over an arrangement involving the direct drilling and tapping into the block. Moreover the reduction of the stress factor is given by ratio of the pitch diameter of the internal thread to the pitch diameter of the body thread. Thus, the larger the diameter of the insert member 120 the more supporting area that is possible whereby the softer (lower yielding) material that can be utilized to withstand the stress involved.

It will be apparent that various changes may be made in the construction and arrangement of parts without departing from the scope of the invention as defined by the following claims. For example, while the bore means 50 shown in the above-described embodiments of the invention comprise two cylindrical bore portions 51 and 52 extending internally within body 10 between the body faces which mate with the adjacent fluid flow components of the system, this bore means can take various forms depending on the construction of the insert body. Thus, if the insert body were made with a pair of flanges forming the faces which mate with adjacent components, the bore means may be constructed with a first bore portion formed in one flange adapted to receive the enlarged bearing portion of a stud adapter and a second bore portion adapted to receive the female end of the stud adapter.

Another possible variation is that the wrenching portion 42 does not have to be provided with a peripheral surface configuration adapted to be engaged by a wrench or the like. For example, the wrench engaging portion may be located at some other location on the stud adapter and may be eliminated altogether in some cases.

Figure 20:
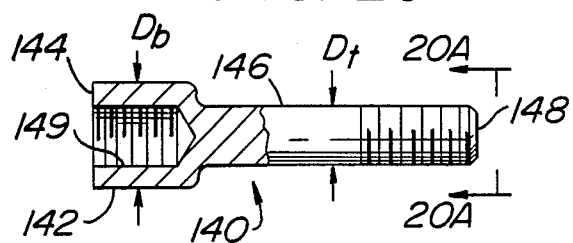
FIGS. 20–23 shown an embodiment of the invention comprising a female to male version of the stud adapter.
Figure 20A:
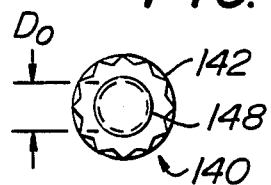

In FIGS. 20 and 20A there is shown the female to male version of a stud adapter in accordance with the invention. This stud adapter 140 has an enlarged wrenching portion 142 forming an annular bearing surface 144 and a cylindrical stem portion 146 provided with an externally threaded male end 148. Wrenching portion 142 has an external surface configuration adapted to be engaged by a wrench, as is best shown in FIG. 20A. The end of stud adapter 140 at the bearing surface 144 is provided with a female threaded connection. To this end, wrenching portion 142 is provided with an internally threaded bore 149 forming the female end of stud adapter 140.

Stud adapter 140 has the same unique geometry as the male to female stud adapters 12, 12' and 12" described previously, the only essential difference being that stud adapter 140 has the end at the bearing surface (designated $D_b$) provided with a female threaded connection and the end adjacent to the tensile diameter portion (designated $D_t$) provided with a male threaded connection. The geometry of stud adapter must be such that the tensile are within $D_t$ meets or exceeds the area within the minor diameter of the male thread (designated $D_o$). The method for finding the minimum bearing diameter is the same as hereinbefore described (see Equation 5), where $D_t$ is approximately equal to the tensile diameter of the stud adapter 140 or the major diameter of the male thread at 148, whichever is larger. Also, the enlarged wrenching portion 142 must be of such a length to allow sufficient engagement of a male thread into the adapter at threaded bore 149 by the male end 148 of a coupled stud adapter. Sufficient engagement of the thread is defined as the length needed so as not to shear (strip) the threads under the working load. The engagement length may be quantified as follows:

Resisting Area to Shear =

$\pi$(Minor Diameter of Male Thread) (Engagement)

The load divided by this area must be less than or equal to the yield stress of the material divided by the desired safety factor, such that:

$$\frac{F_s}{\pi (D_o) (E)} \geq \frac{\sigma_{yp}}{n}$$

Where:
$F_s$ = Separating force (load) ) (lbs.)
$D_o$ = Minor diameter of male thread (inches)
E = Engagement of thread (inches)
$\sigma_{yp}$ = Material Yield Point (lbs/inch$^2$)
n = Safety Factor
Thus:

$$\frac{F_s n}{(\sigma_{yp}) (D_o) \pi} \leq E$$

Figure 21:
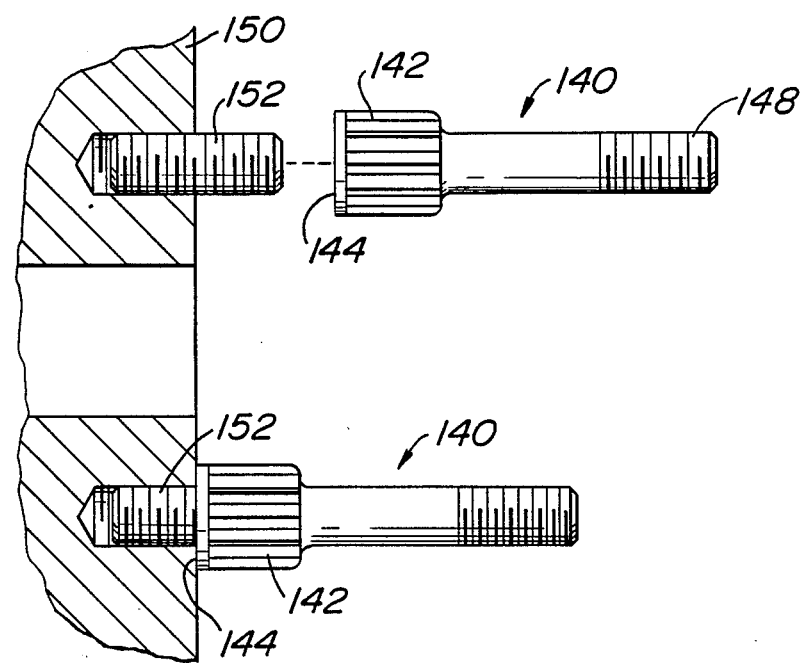

FIG. 21 shows the manner in which the stud adapters 140 are attached to the mounting surface of a typical fluid flow component 150 which are usually provided with a female threaded bore for connection to an adjacent component. With the female to male stud adapters 140, it will be necessary to employ threaded studs 152 as shown in FIG. 21. Once the first group of stud adapters 140 is attached to a component, successive groups of adapters 140 may be attached directly to the previous group as shown in FIG. 22, for example.

Figure 22:
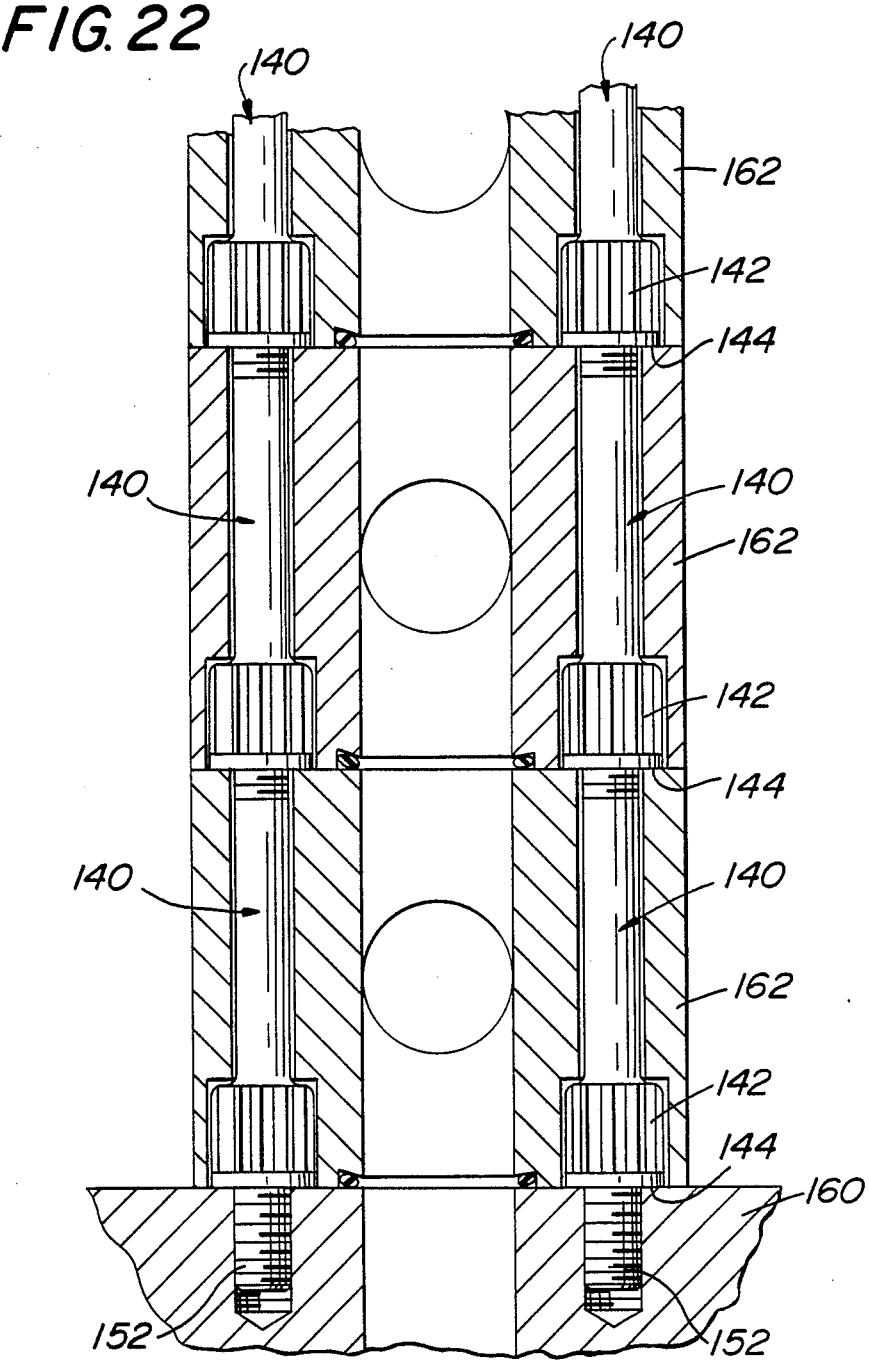

FIG. 22 shows three groups of stud adapters 140 arranged to support and couple the bodies 162 of three insert means adjacent to a fluid flow component 160. FIG. 22 is similar to FIG. 6 except that stud adapters 140 are used instead of male to female adapters 12. As shown in FIG. 22, the bore means in bodies 162 are, of course, of a size to accommodate the wrenching portion and the stem portion of the stud adapters 140.

Figure 23:
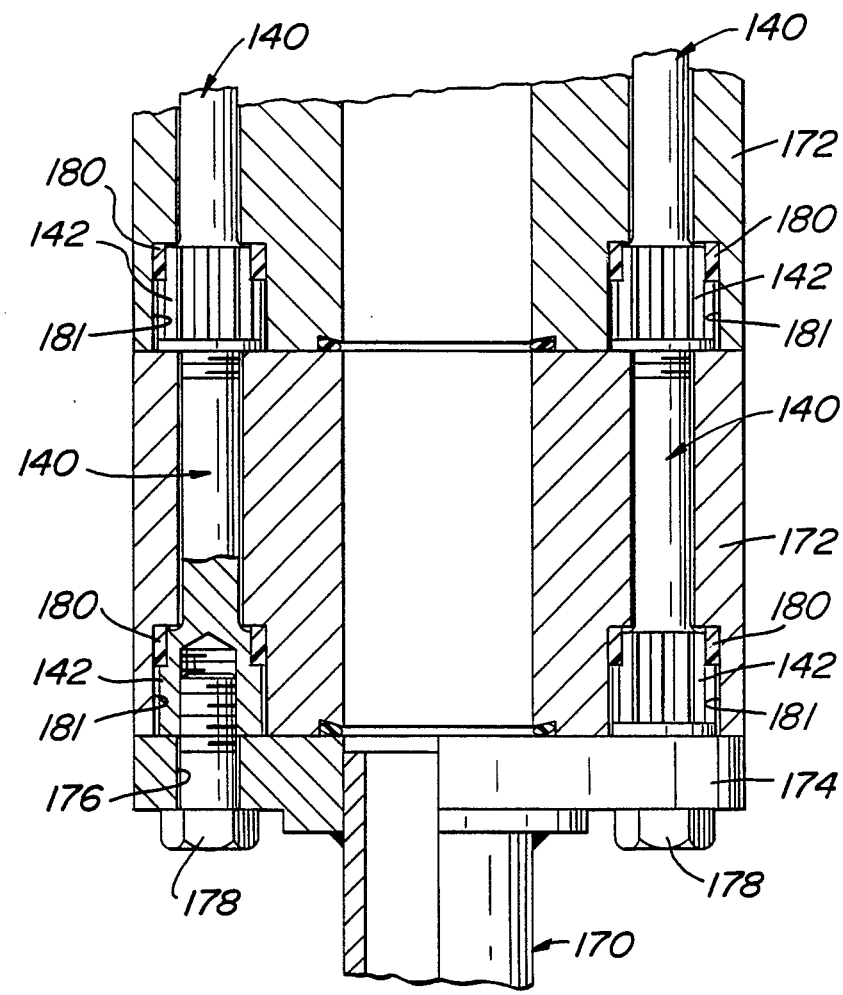

FIG. 23 shows how the stud adapters 140 can be used to attach the body 172 of an insert means to a fluid flow component 170 having flange 174 providing the mounting face. In this case flange 174 is provided with bolt holes 176 and bolts 178 are used to fasten the stud adapters 140 to the flange 174 as shown in FIG. 23.

The stud adapter 140 can be used in all the applications of the stud adapters 12, 12' or 12" and can be provided with means, such as the resilient insert 70 as shown in FIG. 9, for resisting stud adapter rotation. Thus, in FIG. 23 there is provided an annular resilient insert 180 held, such by cementing, inside the enlarged bore portion 181 of each of the bore means in each body 172. The internal diameter of the insert 180 is just less than the diameter of the wrenching portion 142 of the stud adapter 140. Thus, insert 180 is larger than the space between the surface of wrenching portion 142 and the wall of the surrounding enlarged bore portion 181 so as to be deformed therebetween when a stud adapter 140 is inserted within a bore means of body 172. Accordingly, insert 180 provides engagement between body 172 and stud adapter 140 to resist rotation of the stud adapter 140. By reason of the provision of these retaining inserts 180, the last set of stud adapters in a series that are being wrenched for disassembly will always break open before any others in the series.

I claim:

1. An insert means for a fluid flow system having a pair of fluid flow components comprising:
a body having a plurality of faces,
two of said faces being adapted to mate with corresponding faces of the fluid flow components of the system with said body inserted therebetween,
said body having a fluid flow passage for the flow of fluid between said pair of system components,
and a plurality of stud adapters each of which has an externally threaded male end and an internally threaded female end,
each stud adapter having an enlarged portion located adjacent said male end and forming a bearing surface,
said body having bore means for receiving each stud adapter, each of said bore means having a first bore portion adjacent one of said two faces adapted to receive the enlarged portion of an associated stud adapter and a second bore portion adjacent the other of said two faces adapted to receive the female end of an associated stud adapter,
said male end of each stud adapter being adapted to threadedly engage one of the system components with said bearing surface in bearing contact with the corresponding face thereof for supporting said body with said one body face in contact with one of the system components, and said female end of each stud adapter is adapted to be threadedly engaged with means for mounting the other of said system components in contact with the other body face.

2. An insert means according to claim 1 wherein each stud adapter has a cylindrical stem portion extending between said enlarged portion and said female end, each of said second bore portions having a cylindrical portion adapted to receive said stem portion.

3. An insert means according to claim 2 wherein each of said bore means in said body is constructed so that said enlarged portion of a stud adapter is contained entirely within said first bore portion and said cylindrical stem portion is contained entirely within said cylindrical bore portion, the distance between said bearing surface and the end of said stem portion being less than the distance between said two faces of said body.

4. An insert means according to claim 2 wherein the cylindrical bore portion receiving at least one of said stud adapter cylindrical stem portions is in flow communication with said fluid flow passage, and including annular sealing means extending around said cylindrical stem portion at locations to seal said cylindrical bore portion against the flow of fluid therethrough from said fluid flow passage.

5. An insert means according to claim 2 wherein said body includes a body portion and an end plate portion,
  each of said bore means having said cylindrical bore portion thereof formed in said body portion and said first bore portion thereof formed in said end plate portion, said cylindrical bore portion being adapted to contain said stem portion of a stud adapter and said first bore portion being adapted to contain said enlarged portion of a stud adapter,
  said end plate being adapted to be mounted in face-to-face contact with said body portion at two opposite faces thereof so as to locate a first bore portion at opposite ends of an associated cylindrical bore portion,
  whereby said stud adapters can be mounted in said body in either of two opposite orientations so that said body can be mounted to a fluid system component in either of two opposite orientations.

6. An insert means according to claim 5 wherein said end plate defines a portion of said fluid flow passage and comprises sealing means on each face thereof encircling said fluid flow passage for sealing a face thereof against a cooperating face of a fluid system component.

7. An insert means according to claim 1 wherein sealing means are mounted on one of said body faces to extend around said fluid flow passage, said sealing means being adapted to make a sealing contact with the corresponding face of the flow system component.

8. An insert means according to claim 7 wherein said sealing means comprises a counterbore recess formed in said one body face concentric with said fluid flow passage and an annular sealing member contained in said counterbore recess.

9. An insert means according to claim 1 including a second body having two faces and a fluid flow passage constructed and arranged similar to that of said first-mentioned body, and a plurality of said stud adapters associated with said second body whereby said second body can be secured to said first-mentioned body and said system component can be secured to said second body.

10. An insert means according to claim 1 wherein said bearing surface of said each stud adapter is of an adapter such that each stud adapter can be threadedly engaged with the corresponding system component with the stud adapter in a preloaded contact with the mounting surface without any permanent deformation at the contact area and such that the preloading of all stud adapters together is greater than the anticipated separating force due to the pressurization of the system.

11. An insert means according to claim 1 wherein each stud adapter has a stud portion extending from said enlarged portion to form said threaded male end, said stud adapter being made of a single-piece structure.

12. An insert means according to claim 1 wherein each stud adapter has a stem portion extending between said enlarged portion and said female end and a stud extending from said enlarged portion to form said threaded male end, said stud portion and said stem portion being made of separate parts joined together.

13. An insert means according to claim 12 wherein said stem portion is hollow providing a hollow structure from said female end to said stud portion.

14. An insert means according to claim 1 including means for resisting rotating of the stud adapter positioned within at least one of said means including an insert member providing engagement between said enlarged portion of said stud adapter and said first bore portion.

15. An insert means according to claim 14 wherein said first bore portion has an internal wall, said means providing engagement between said enlarged portion and said first bore portion includes an annular insert made of a resilient material and extending around said wall of said first bore portion, said wall being larger than said enlarged portion to provide a space therebetween, said annular insert being larger than the space between said enlarged portion and the wall of said first bore portion so as to be deformed therebetween.

16. An insert means according to claim 1 wherein said first bore portion has a depth, and said enlarged portion of said stud adapter has a depth, the depth of said first bore portion is just less than the depth of the enlarged portion of said stud adapter and said body is made of a softer material than the enlarged portion of said stud adapter so that the adapter will coin into said body during assembly to thereby serve as a mechanical lock against rotation.

17. An insert means according to claim 1 including valve means contained in said body for controlling the flow of fluid through said fluid flow passage.

18. An insert means according to claim 17 wherein said body comprises a main body portion and a mounting head portion, said main body portion having a cavity for receiving said valve means, said mounting head portion being constructed and arranged for containing said valve means in position in said cavity.

19. An insert means according to claim 1 wherein said body has a third face extending between said two faces thereof, a schematic marking on said third face depicting the actual flow path of said fluid flow passage and any valving or flow control means therefor contained in said body whereby an actual schematic is formed by the assembly of a plurality of said bodies adjacent one another into a fluid flow system.

20. An insert means according to claim 1 wherein said body has a third face having a plurality of bores formed therein, and including a plurality of insert members, each of said insert members being mounted in said body to extend into a bore in said third face and having internally threaded portions for threadedly engaging a threaded member to be secured to said body, said insert members being made of a harder material than said body.

21. An insert means according to claim 20 wherein each of said insert members has a transversely extending bore arranged to have a stud adapter extending therethrough so as to be anchored on a stud adapter.

22. An insert means according to claim 20 wherein each of said insert members is externally threaded and is threadedly engaged in an internally threaded bore in said third face of said body.

23. A fluid flow system according to claim 1 wherein said bore means extends between said two faces internally of said body.

24. A fluid flow system according to claim 1 wherein said enlarged portion of each stud adapter has a peripheral surface configuration adapted to be engaged by a wrench or the like, said surface configuration extending only part of the length of said enlarged portion, the other part of said enlarged portion forming said annular bearing surface constructed and arranged to contact the face of an adjacent insert, said annular bearing surface having a circular outer edge extending around the outside diameter of said enlarged portion thereby minimizing the bearing stresses on said enlarged portion and said contacted face.

25. For use in a pressurized fluid flow system having a plurality of fluid flow components including a pair of adjacent inserts each of which has a body adapted to mate wit corresponding faces of the fluid flow components of the system adjacent thereto, each body having at least one internal passage for the flow of gas or liquid under pressure,
    means for coupling together the pair of adjacent inserts to provide flow communication between said internal passages thereof comprising:
    a plurality of stud adapters each of which has a stud portion providing an externally threaded male end and a stem portion providing an internally threaded female end,
    each stud adapter having an enlarged portion located adjacent said stud portion thereof and forming an annular bearing surface constructed and arranged to contact the face of an adjacent insert during assembly of the inserts in adjacent coupled relation,
    said enlarged portion of each stud adapter having an external dimension greater than that of said stem portion thereof so that each said bearing surface thereof is located radially outwardly of the periphery of the associated stem portion, said annular bearing surface having a circular outer edge extending around the outside diameter of said enlarged portion thereby minimizing the bearing stresses on said enlarged portion and said contacted face.

26. For use in a pressurized fluid flow system having a plurality of fluid flow components including a pair of adjacent inserts each of which has a body adapted to mate with corresponding faces of the fluid flow components of the system adjacent thereto, each body having at least one internal passage for the flow of gas or liquid under pressure,
    means for coupling together the pair of adjacent inserts to provide flow communication between said internal passages thereof comprising:
    a plurality of stud adapters each of which has a stud portion providing an externally threaded male end and a stem portion providing an internally threaded female end, each stud adapter having an enlarged portion located adjacent said stud portion thereof and forming an annular bearing surface constructed and arranged to contact the face of an adjacent insert during assembly of the inserts in adjacent coupled relation,
    a first group of said stud adapters being adapted to be received in a bore means in the body of one of said inserts for supporting same,
    said first group of stud adapters being adapted to engage a system component adjacent to said one insert with the bearing surface of each stud adapter in bearing contact with a face of said adjacent system component,
    a second group of said adapters being adapted to be received in bore means in the body of the other of said inserts for supporting same,
    said male ends of each of said second group of stud adapters being adapted to threadedly engage the female ends of said first group of stud adapters with the bearing surfaces of said second group of stud adapters in bearing contact with a face of said one insert,
    each stud adapter having a stud portion and a stem portion made of separate parts joined together.

27. Coupling means according to claim 26 wherein said stem portion of each stud adapter is hollow providing a hollow structure from said female end to said stud portion.

28. A fluid flow system having a plurality of fluid flow components coupled to one another in end-to-end relation wherein each of said fluid flow components comprises:
    a body having a plurality of faces, two of said faces being adapted to mate with corresponding faces of the fluid flow components of the system adjacent thereto,
    said body having a fluid flow passage for the flow of fluid between said two faces,
    and a plurality of stud adapters associated with each body each of which has an externally threaded male end and an internally threaded female end,
    each stud adapter having an enlarged portion forming a bearing surface constructed and arranged to contact the face of an adjacent component,
    said body having a bore means accommodating each stud adapter, each of said bore means having an enlarged bore portion adjacent one of said two faces adapted to receive the enlarged portion of an associated stud adapter with said bearing surface of the associated adapter in position to contact the face of an adjacent component with the associated adapter extending from the adjacent component for supporting said body with the associated adapter within said bore means of said body,
    said enlarged stud adapter portion having a longitudinally extending outer wall and including means for resisting rotation of the stud adapter positioned within at least one of said bore means including an insert providing engagement between said outer wall of said enlarged portion of said stud adapter and said bore means.

29. An insert means according to claim 20 wherein said one bore means has an internal wall, said means providing engagement between said enlarged portion of said bore means includes an annular insert made of a resilient material and extending around said wall of said bore means, said wall being larger than said enlarged portion to provide a space therebetween, said annular insert being larger than the space between said enlarged portion and the wall of said bore means so as to be deformed therebetween.

30. A fluid flow system having a plurality of fluid flow components coupled to one another in end-to-end relation wherein each of said fluid flow components comprises:

a body having a plurality of faces, two of said faces being adapted to mate with corresponding faces of the fluid flow components of the system adjacent thereto, said body having a fluid flow passage for the flow of fluid between said two faces, a plurality of stud adapters associated with each body each of which has an externally threaded male end and an internally threaded female end, each stud adapter having an enlarged portion forming a bearing surface arranged to contact the face of an adjacent component, said body having a bore means accommodating each stud adapter, each of said bore means having an enlarged bore portion adjacent one of said two faces adapted to receive the enlarged portion of an associated stud adapter, the stud adapters for adjacent components being engaged in an end-to-end series arrangement, and an insert means associated with each stud adapter providing frictional engagement between each stud adapter and an accommodating bore means when a body containing said bore means is positioned to contain its associated stud adapters.

31. A fluid flow system according to claim 30 wherein each of said insert means include an insert made of resilient material arranged to provide frictional engagement between said enlarged portion of each stud adapter and the associated bore means.

32. A fluid flow system according to claim 31 wherein said associated bore means has an internal wall in opposed relation to said enlarged portion, said resilient insert is annular and is arranged to extend around said wall and the opposed portion of said enlarged portion of each stud adapter, said wall being larger than said enlarged portion to provide a space therebetween, said annular insert being larger than the space between said wall and said enlarged portion so as to be deformed therebetween.

33. A fluid flow system having a plurality of fluid flow components coupled to one another in end-to-end stacked relation wherein each of said fluid flow components comprises:

a body having a plurality of faces, two of said faces being adapted to mate with corresponding faces of the fluid flow components of the system adjacent thereto, said body having an internal fluid flow passage for the flow of fluid between said two faces, and a plurality of stud adapters associated with each body each of which has an externally threaded male end and an internally threaded female end, each stud adapter having an enlarged portion forming a bearing surface constructed and arranged to contact one of said mating body faces during the assembly of said bodies in stacked relation, said stud adapters being interconnected at said male and female ends in a plurality of series of end-to-end stud adapters, each of said bodies having a plurality of bore means extending between said two faces thereof, said bore means of the stacked bodies being arranged in a plurality of lines each of which contains a stud adapter series, each of said bore means having an enlarged bore portion adjacent one of said two mating faces of the body containing the same and facing the corresponding mating face of an adjacent body, said enlarged bore portion of each bore means being arranged to fit over and receive the enlarged portion of the stud adapter that forms a bearing surface adapted to contact the corresponding face of a body adjacent said enlarged bore portion, a plurality of stud adapters being arranged to present a plurality on enlarged stud adapter portions adjacent the corresponding face of a previously stacked body and adapted to be received in the enlarged bore portion of the bore means of the next body to be stacked for supporting said next body during the assembly thereof in stacked relation next to said previously stacked body, the arrangement being such that during assembly of the system a set of said stud adapters having their enlarged stud adapter portions adjacent the corresponding face of a previously stacked flow component with said bearing surfaces in contact therewith and are then received in the enlarged bore portions of the bore means of the next flow component to be stacked for supporting the same during the assembly thereof in stacked relation next to said previously stacked component, and an insert means associated with each stud adapter in a series thereof for resisting the rotation thereof by providing engagement between said enlarged portion of each stud adapter whose bearing surface is in contact with a previously stacked flow component and the enlarged bore portion of the next flow component assembled in its stacked position adjacent the previously stacked flow component, said rotation resistance being removed from a stud adapter in the end of the series thereof when the next assembled flow component supported by said end stud adapter is removed from its stacked position thereby removing said engagement provided by said insert means between said enlarged portion of the end stud adapter and said enlarged bore portion of the removed next flow component.

34. A fluid flow system according to claim 33 wherein said enlarged bore portion of each bore means has a wall adjacent the contained enlarged portion of each stud adapter and extending therearound, said insert means being made of resilient material and is arranged to extend around the wall of said enlarged bore portion adjacent the contained enlarged portion of each stud adapter.

* * * * *

UNITED STATES PATENT AND TRADEMARK OFFICE
CERTIFICATE OF CORRECTION

PATENT NO. : 4,934,411

DATED : Jun. 19, 1990

INVENTOR(S) : David E. Albrecht

It is certified that error appears in the above-identified patent and that said Letters Patent is hereby corrected as shown below:

Column 8, line 19, equation (9) should read — $\sigma = M_y/I$ —.

Column 8, line 65 to Column 9, line 4, equations (15) and (16) should be transposed.

Column 11, line 21, "system" should read — stem —.

Column 13, lines 53 to 54, that portion of the equation reading "$\geq$" should read — $\leq$ —.

Column 19, line 1, "20" should read — 28 —.

Signed and Sealed this

Seventeenth Day of December, 1991

Attest:

HARRY F. MANBECK, JR.

*Attesting Officer*   *Commissioner of Patents and Trademarks*